April 3, 1956 — H. A. PICKENS — 2,740,248
LIQUID SPRAY MEANS FOR MOWING DEVICES
Filed Dec. 29, 1954 — 2 Sheets-Sheet 1
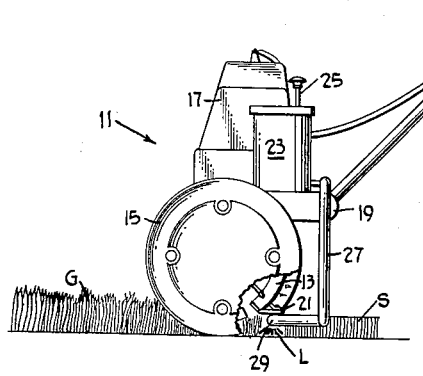
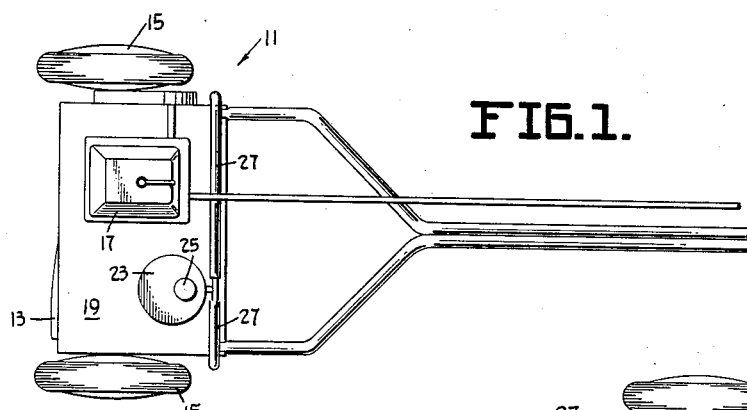
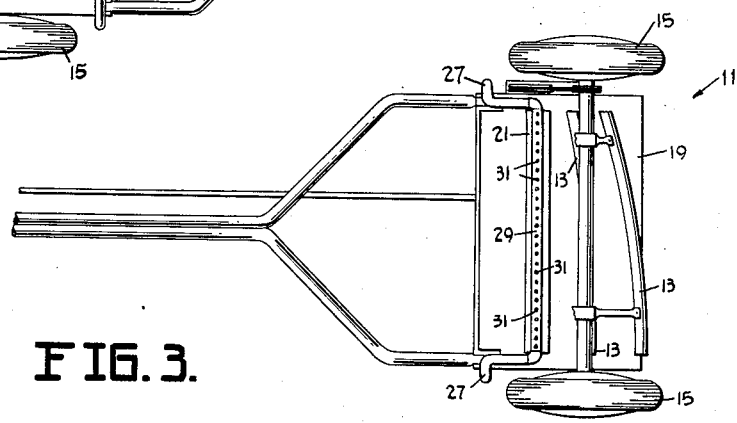
INVENTOR
HOWARD A. PICKENS April 3, 1956  H. A. PICKENS  2,740,248
LIQUID SPRAY MEANS FOR MOWING DEVICES
Filed Dec. 29, 1954  2 Sheets-Sheet 2

INVENTOR
HOWARD A. PICKENS
BY
Weatherford & Weatherford
attys

United States Patent Office 2,740,248
Patented Apr. 3, 1956

2,740,248

LIQUID SPRAY MEANS FOR MOWING DEVICES

Howard A. Pickens, Memphis, Tenn.

Application December 29, 1954, Serial No. 478,295

9 Claims. (Cl. 56—229)

This invention relates to certain new and useful improvements in mowing devices, and particularly relates to a new and novel combination of a mowing device and means for delivering liquid spray to a mowed area. More particularly the invention relates to a device of the general character mentioned which is particularly adapted for use in the spray delivery of liquid, such as liquid fertilizer, to areas of vegetation, such as lawns, hay fields and kindred types of locations.

It is considered desirable to frequently fertilize certain types of vegetated areas and particularly grassy areas, as for example lawns, in order to enhance the growth and beauty of the lawn grasses, and in other types of grassy areas, such as fields in which forage crops as in the nature of hay, oats and other grasses are grown and are mowed from time to time, to fertilize such areas to enhance the quality and quantity of subsequent growth.

Previous devices have contemplated the use of spray attachments for spray purposes in conjunction with agricultural instrumentalities. It, however, is found that the optimum results of fertilizing are to be obtained when a liquid spray of fertilizer is applied to the grassy areas immediately following the separation of the grasses from their stems, as by mowing, at which time there is a minimum of impedance for the introduction of the liquid spray along the remaining stems and onto the earth therebeneath. This effect is additionally enhanced if immediately following such spray application a cover in the nature of a mulch or the like is laid over the sprayed area, since such covering minimizes the loss by evaporation and other undesired causes of the liquid employed in the treatment.

The prior devices which have been employed in spray attachments in conjunction with agricultural instrumentalities are substantially incapable of properly performing the sequence of operation specifically desired under the presently described conditions.

It will be observed that the mere spraying of liquid fertilizer upon a grass crop prior to the separation of grasses from the stems as by mowing is inefficient and fails to insure the optimum delivery of the fertilizer to the roots of the grasses and the earth therearound, and additionally if the spraying is undertaken after the separation of grasses from their stems, as by mowing, and after the deposit of the cut grasses rearwardly of the mower, such procedure is similarly inefficient since the cut grasses effectively blanket the area and substantially inhibit the entrance of fertilizer thereto.

The present invention is primarily directed to provide equipment with which the liquid spray of fertilizer or of other materials may be delivered to a mowed area subsequent to the mowing separation of grasses from their stems and immediately prior to the deposit of the cut grasses rearwardly of the mowing devices, and accordingly provides for the optimum delivery of the liquid spray to the growing crop at a time when the area is in superior condition for receiving the spray, and additionally provides for covering of the delivered spray by the deposit of the grasses rearward of the mowing means and immediately subsequent to such spraying.

The principal object of the present invention is to provide in a mower which includes a transverse fixed bar and cutter means movable relative to the bar which cooperate to separate grasses from their stems, spray means mounted vertically beneath and underlying the fixed bar positioned to deliver spray downwardly onto the mowed area immediately following mowing and being shielded by the fixed bar from the separated grasses which pass thereover and move rearwardly therebeyond, and accordingly when deposited on the mowed area are so deposited after such spraying.

A further object of the invention is to provide in a mower spray means positioned intermediate the forward cutting zone and the rearwardly grass deposit zone.

A further object of the invention is to provide such a device in which a liquid reservoir and spray pressure means are mounted upon and carried with the mower.

A further object of the invention is to provide such a device for use in conjunction with a mower as for lawns, which includes rotary reel-type cutter means.

A further object of the invention is to provide such a device in combination with a mower, as for fields or other grassy areas, comprising a transversely reciprocable cutter means; and A further object of the invention is to provide a new and novel liquid spray means for mowing devices.

The means by which the foregoing and other objects of the present invention are accomplished and the manner of their accomplishment will readily be understood from the following specification upon reference to the accompanying drawings, in which:

Fig. 1 is a top plan view of a mower for lawns embodying the present invention.

Fig. 2 is a side elevational view of the device of Fig. 1, with certain parts broken away for purposes of illustration.

Fig. 3 is an inverted plan view of the device of Fig. 1, with parts broken away for illustration.

Figure 5:
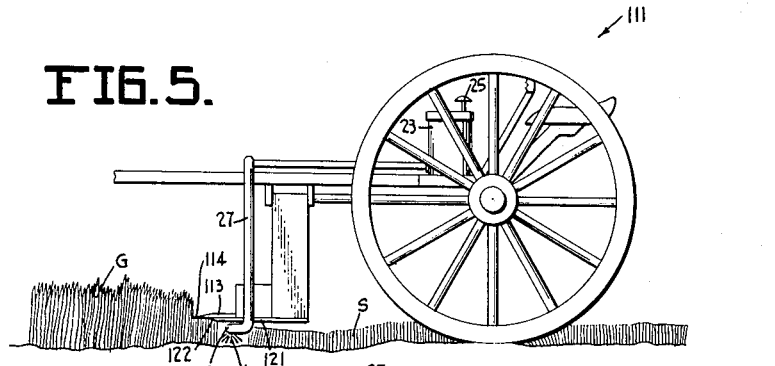
Fig. 5 is a side elevational view of the invention as shown in Fig. 4.

Referring now to the drawings in which the various parts are indicated by numerals, in Figs. 1, 2 and 3 illustrated, one embodiment of the present invention in which it is employed in conjunction with a conventional reel-type mower for lawns 11, which is illustrated as of the type having a gang of spiral segment cutter blades 13 supported at opposite ends as from wheels 15 to provide a cutter reel which is rotatably movable during forward motion of the mower 11, effecting rotating movement of the cutter blades 13. The specific device shown provides for drive of the mower as by a motor 17 which may be mounted as upon a platform 19. It will be understood that the motor may be omitted without departing from this invention.

In conventional manner mower 11 includes a transversely disposed fixed bar 21, the cutter blades 13, upon rotation, being successively moved past the edge of bar 21 in shearing relationship thereto and under forward motion of mower 11 effecting separation of grass G from stems S along the forward portion of the fixed bar 21, the separated or cut grass G being deflected over the fixed bar 21 and deposited rearwardly thereof.

The spray means of the present invention comprise a liquid reservoir 23 which is preferably mounted upon platform 19, although it may be otherwise supported, reservoir 23 being preferably provided with a pressure building plunger 25 for effecting compression of the liquid contents of the reservoir 23 for preferred discharge therefrom under pressure. A pair of tubes 27 are communicated at one end with the contents of reservoir 23 and at their opposite ends tubes 27 communicate with the ends of a perforated spray pipe 29, spray pipe 29 being provided with downwardly directed spray openings 31. As illustrated, spray pipe 29 is connected to bar 21 and is mounted vertically therebeneath, being extended transversely of mower 11 and being substantially coextensive in length with bar 21. It will be observed that spray pipe 29 is positioned intermediate the forward cutting zone of fixed bar 21 and the rearward grass discharge edge of bar 21.

As can readily be seen, in the use of this embodiment of the invention forward motion of mower 11 effects cutting of grass G from stems S along the forward cutting zone of bar 21 under the shearing motion of cutters 13 relative thereto, and the liquid spray L is delivered through spray pipe 29 and openings 31 being discharged directly onto stems S at a point immediately rearward of the cutting zone and at a time when the cut grass G is passing over fixed bar 21 and prior to the deposit of grass G beyond the rearward edge of bar 21, the spray pipe and its openings being thus shielded by the fixed bar from engagement with or contact by the cut grass. It additionally will be observed that the cut grass G passing over the rearward edge of fixed bar 21 falls upon stems S, immediately subsequent to the discharge of liquid spray L onto the stems and effects a protective cover for the delivered liquid spray.

Figure 4:
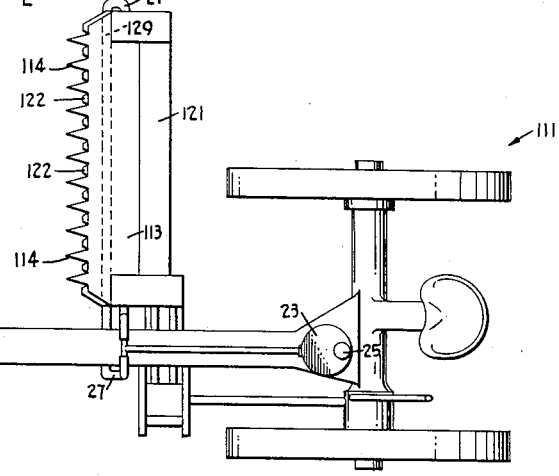
Fig. 4 is a top plan view of a mower for fields and other grassy areas embodying the invention.
Figure 6:
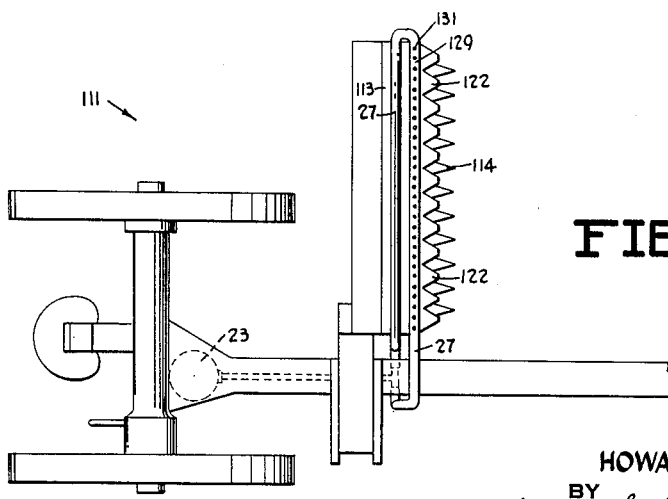
Fig. 6 is an inverted plan view of the embodiment of the invention in Fig. 4.

In the modified embodiment illustrated in Figs. 4 to 6, a mower, for fields or other grassy areas, 111 is illustrated, the mower 111 being of the type having a transversely reciprocable cutter 113, of the conventional type including a plurality of teeth 114, which are reciprocably movable relative to a transversely disposed fixed bar 121, provided with a modified series of teeth 122, the movement of movable cutter 113 relative to fixed bar 121 effecting shearing of grass G from stems S along a forward portion of the fixed bar, the cut grass G being moved rearwardly over the bar and cutter and being subsequently deposited rearwardly over the fixed bar.

Like the embodiment of Figs. 1 to 3, the embodiment of Figs. 4 to 6 includes a reservoir 23 preferably having a pressure building plunger 25 for containing and discharging as spray a liquid L, the reservoir being communicated by tubes 27 to the opposite ends of a perforated spray pipe 129, spray pipe 129 including downwardly facing spray openings 131. Spray pipe 129 is mounted substantially in vertical alinement with fixed bar 121, the fixed bar and the spray pipe extending transversely of the mower 111 and being substantially coextensive in length. It will be observed that spray pipe 129 is positioned intermediate the forward cutting zone of fixed bar 121 and the rearward grass discharge zone of the bar.

In the use of the device illustrated in Figs. 4 to 6, forward motion of mower 111 engages cutter 113 and fixed bar 121 with grass G, reciprocation of the movable cutter relative to the fixed bar 121 effecting separation of grass G from the stems, which, in the case of field grasses and forage grasses, provides hay for subsequent gathering. During the movement of mower 111, liquid L is delivered from reservoir 23 to spray pipe 129 and discharges as spray through openings 131 immediately rearward of the cutting zone and directly onto the stems S immediately following separation of grass G therefrom. Simultaneously the grass G which has been separated is deflected over the fixed bar 121 which assists in shielding pipe 129 and spray openings 131 from engagement by or contact with cut grass G, and as in the previous embodiment, the cut grass G discharges rearwardly of the cutter bar onto the stems subsequent to the application of liquid spray L thereto.

It will be understood that other modifications in the form and arrangement of the mower means may be employed without departing from the spirit and scope of this invention which is defined in the appended claims.

It will be seen that when desired the liquid L may be a liquid fertilizer which, in the manner described, through the employment of the present invention, is discharged upon freshly mowed grass areas under the optimum conditions described. It will also be observed that in some instances it may be desirable to substitute other liquids, as for example insecticides or weed killers, and similarly accomplish optimum deliveries thereof to areas of vegetation.

I claim:

1. In a mower which includes transverse fixed bar means and movable cutter means cooperating for effecting mowing of grasses or the like from their stems along the forward portion of said bar under forward motion of said mower, a liquid reservoir mounted on said mower, pressure spray means communicated with said reservoir, a transversely disposed horizontal spray pipe including downwardly directed spray openings, said pipe being substantially coextensive in length with said fixed bar and being mounted substantially vertically below and underlying said bar intermediate the forward and rearward portions of said bar with said spray openings downwardly unobstructed, said fixed bar extending rearwardly beyond said spray pipe openings to deflect cut grasses from and rearwardly over said pipe and openings, tube means communicating said pipe with said reservoir for delivery of liquid under pressure into said pipe, whereby to spray liquid from said reservoir onto said stems subsequent to separation of greases therefrom and prior to deposit of cut grasses rearwardly beyond said fixed bar.

2. A device in accordance with claim 1 in which said movable cutter means comprises rotatable reel means including a plurality of cutter blades.

3. A device in accordance with claim 1, in which said fixed bar includes a series of teeth in its forward portion and said movable cutter means comprises a transversely reciprocable toothed cutter.

4. In a mower which includes transverse fixed bar means and movable cutter means cooperating for effecting mowing of vegetation or the like from their stems along the forward portion of said bar under forward motion of said mower, liquid reservoir means, a transversely disposed horizontal spray pipe including downwardly directed spray openings, said pipe being substantially coextensive in length with said fixed bar and being mounted substantially vertically below and underlying said bar intermediate the forward and rearward portions of said bar with said spray openings downwardly unobstructed, said fixed bar extending rearwardly of said spray pipe openings to deflect cut vegetation from and rearwardly over said pipe and openings, tube means communicating said pipe with said reservoir means for delivery of liquid into said pipe, whereby to spray liquid from said reservoir means onto said stems subsequent to separation of vegetation therefrom and prior to deposit of cut vegetation rearwardly beyond said fixed bar.

5. A device in accordance with claim 4, in which said movable cutter means comprises rotatable reel means including a plurality of cutter blades.

6. A device in accordance with claim 4, in which said fixed bar includes a series of teeth in its forward portion and said movable cutter means comprises a transversely reciprocable toothed cutter.

7. In a mower which includes transverse fixed bar means and movable cutter means cooperating for effecting mowing of grasses or the like from their stems along the forward portion of said bar under forward motion of said mower, liquid reservoir means, a transversely disposed spray pipe including downwardly directed spray openings, said pipe being mounted below and underlying said bar with said spray openings downwardly unobstructed, said fixed bar extending rearwardly of said spray pipe openings to deflect cut grasses from and rearwardly over said pipe and openings, tube means communicating said pipe with said reservoir means for delivery of liquid into said pipe, whereby to spray liquid from said reservoir means onto said stems subsequent to separation of grasses therefrom and prior to deposit of cut grasses rearwardly beyond said fixed bar.

8. A device in accordance with claim 7, in which said movable cutter means comprises rotatable reel means including a plurality of cutter blades.

9. A device in accordance with claim 7, in which said fixed bar includes a series of teeth in its forward portion and said movable cutter means comprises a transversely reciprocable toothed cutter.

References Cited in the file of this patent

UNITED STATES PATENTS

| | | |
|---|---|---|
| 1,891,854 | Wade | Dec. 20, 1932 |
| 2,044,884 | Keller | June 23, 1936 |
| 2,503,416 | Russell | Apr. 11, 1950 |
| 2,551,096 | Chittick | May 1, 1951 |
| 2,592,270 | Getz | Apr. 8, 1952 |